United States Patent
Grasser

(10) Patent No.: US 6,680,470 B1
(45) Date of Patent: Jan. 20, 2004

(54) INTERLEAVER WITH THERMAL AND CHROMATIC DISPERSION COMPENSATION

(75) Inventor: Regis Grasser, Albany, CA (US)

(73) Assignee: Dicon Fiberoptics, Inc., Richmond, CA (US)

( * ) Notice: Subject to any disclaimer, the term of this patent is extended or adjusted under 35 U.S.C. 154(b) by 76 days.

(21) Appl. No.: 09/992,527

(22) Filed: Nov. 14, 2001

(51) Int. Cl.$^7$ .................................................. G02F 1/01
(52) U.S. Cl. .................... 250/225; 356/364; 359/494
(58) Field of Search ............................... 250/225, 216, 250/227.17, 227.18, 227.23, 227.28; 356/364–368, 322–327, 453, 491, 494; 359/494–497, 501–502, 122–124

(56) References Cited

U.S. PATENT DOCUMENTS

| | | |
|---|---|---|
| 5,694,233 A | 12/1997 | Wu et al. |
| 5,912,748 A | 6/1999 | Wu et al. |
| 5,978,116 A | 11/1999 | Wu et al. |
| 6,097,518 A | 8/2000 | Wu et al. |
| 6,121,313 A * | 9/2000 | Gao et al. .................... 514/459 |
| 6,130,971 A | 10/2000 | Cao |
| 6,137,606 A | 10/2000 | Wu et al. |
| 6,441,960 B1 * | 8/2002 | Wang et al. ................. 359/497 |

OTHER PUBLICATIONS

Copy of Search Results conducted on Mar. 13, 2001.

* cited by examiner

*Primary Examiner*—Que T. Le
(74) *Attorney, Agent, or Firm*—Parsons Hsue & de Runtz LLP

(57) ABSTRACT

An interleaver employs two birefringent crystals with opposite behavior under temperature variations and chromatic dispersion to achieve temperature stability and to compensate for chromatic dispersion. The interleaver employs a third birefringent crystal made of a birefringent material different from the materials of the other two crystals so that the wavelength components of radiation passing through the interleaver conform to the predetermined International Telecommunications Union grid. One of the three birefringent crystals includes a Faraday rotator placed in a magnetic field. By changing the direction of the magnetic field relative to the optical paths of beams passing through the interleaver, the behavior of the interleaver can be fine tuned to achieve temperature stability and chromatic dispersion compensation in a way that does not require very accurate dimension control of the three crystals.

31 Claims, 11 Drawing Sheets

Description:
101: Birefringent Crystal 1.
102: Birefringent Crystal 2.
103: Faraday Rotator.
104: Quarter Wave Plate.
105: Glan Polarizer.
106: 90 degrees reflexion prism.

INTERLEAVER WITH THERMAL AND CHROMATIC DISPERSION COMPENSATION

BACKGROUND OF THE INVENTION

This invention is related to passive component technology for fiber optics telecommunication application. The purpose of the invention is to improve the present technology related to the Interleaver function. Improvements concern issues related to manufacturing easiness, thermal stability, chromatic dispersion compensation and fine-ajustment of the interleaver response.

With the growing of the telecommunication needs, network designers look toward systems with always higher transmission rates. In the temporal domain, clock period is increased to 40 Gbit per second. In the spectral domain, Wavelength Division Multiplexing (WDM) becomes a Dense Wavelength Division Multiplexing (DWDM) with standard channel spacing of 100 GHz and a short-term evolution to 50 GHz and 25 GHz channel spacing.

This very narrow channel spacing requires the development of new technologies in order to manage the signal of each channel. Interleaver is one of the responses. This device can actually translate a X GHz channel spacing line into two 2X GHz channel spacing lines. It becomes then easier to manage two lines with large channel spacing instead of one line with narrow channel spacing. An output interleaver can then recombine all channels into one single DWDM line as shown in FIG. 1.

It is desirable for an interleaver to have the following characteristics: Low Insertion Loss, low crosstalk, and low polarization sensitivity (Polarization Dependent Loss and Polarization Mode Dispersion). Also, it is desirable for the interleaver device to be useful over a large frequency bandwidth and temperature range. This last point introduces the notion of dispersion effect and thermal sensitivity, when a Fabry Perot cavity is used, for example, the desired spectral response for interleaver function could be achieved. But this response will be suitable only over a couple of degree temperature range and a narrow bandwidth and may not be useful over larger temperature and bandwidth ranges. Therefore, to be useful, thermal stability and chromatic dispersion compensation need to be either further controlled or compensated.

Finally, spectral interleaver response has to match the ITU (International Telecommunications Union) grid. With the thermal and chromatic dispersion effect, it is very desirable for any interleaver deployed to operate so that the wavelength components passing through the interleaver would conform to the ITU grid over the expected temperature and bandwidth ranges experienced by the interleaver.

State of the art schemes employ mainly two ways for thermal stabilization. Compensation can be achieved by using different materials with opposite thermal behavior or simply by using a heater to maintain constant the temperature of the device. The first technique requests a very high accuracy on the material length, so that their thermal effects entirely cancel one another. The second method requires external equipment for heater control and power supply, which is undesirable.

It is therefore desirable to provide an improved interleaver design where the above described difficulties are avoided.

SUMMARY OF THE INVENTION

Conforming to a predetermined wavelength grid of a communication protocol such as the ITU imposes another constraint on interleaver design in addition to thermal stability and chromatic dispersion compensation. One aspect of the invention is based on the observation that, if three birefringent devices are employed where the devices comprise three different optical materials, it is possible to construct an interleaver that controls the routing of the different wavelength components of the radiation in a manner that does not change over a predetermined range of temperatures or over a predetermined range of wavelengths, and at the same time conforms to a predetermined wavelength grid of a communication protocol. Preferably, the three birefringent devices pass radiation from two beams so that the first group of wavelength components of each of the two beams has a polarization state that is different from the polarization state of a second group of wavelength components in the two beams.

In order to avoid having to be very accurate in the dimensions of the optical lengths of the birefringent devices, preferably the birefringence of at least one of the birefringent devices is adjustable so that the effects of the three devices can be fine tuned to achieve the goal of temperature stability and chromatic dispersion compensation. In the preferred embodiment, one of the three birefringent devices is a Faraday rotator placed in a magnetic field. By changing the angle between the magnetic field and the optical path(s) of the optical beam or beams through the Faraday rotator, the behavior of the rotator can be fine tuned, so that the interleaver can achieve temperature stability, and/or chromatic dispersion compensation and preferably also achieve conformation to a predetermined wavelength grid of the communication protocol, without having to design the devices such that their optical path lengths are very accurate.

While the above-described aspects of the invention are particularly useful in an interleaver for interleaving wavelength components conforming to a predetermined wavelength grid of a communication protocol, certain aspects of the invention described above can also be used for other applications.

The present invention is an improvement of previous designs to reach a thermal stability and chromatic dispersion compensation. And it includes a way to finely adjust the interleaver spectral response to the ITU grid. One of the motivations is the feasibility of the device in the production line. This method presents the advantage of a possible adjustment of the interleaver spectral response after assembly, alignment and curing of the optical parts of the component.

BRIEF DESCRIPTION OF THE DRAWINGS

FIG. (1) is a block diagram of an interleaver to demonstrate its function.

FIG. (2) is a schematic diagram of a Faraday rotator in a magnetic field to illustrate one aspect of the invention.

Figure 1:
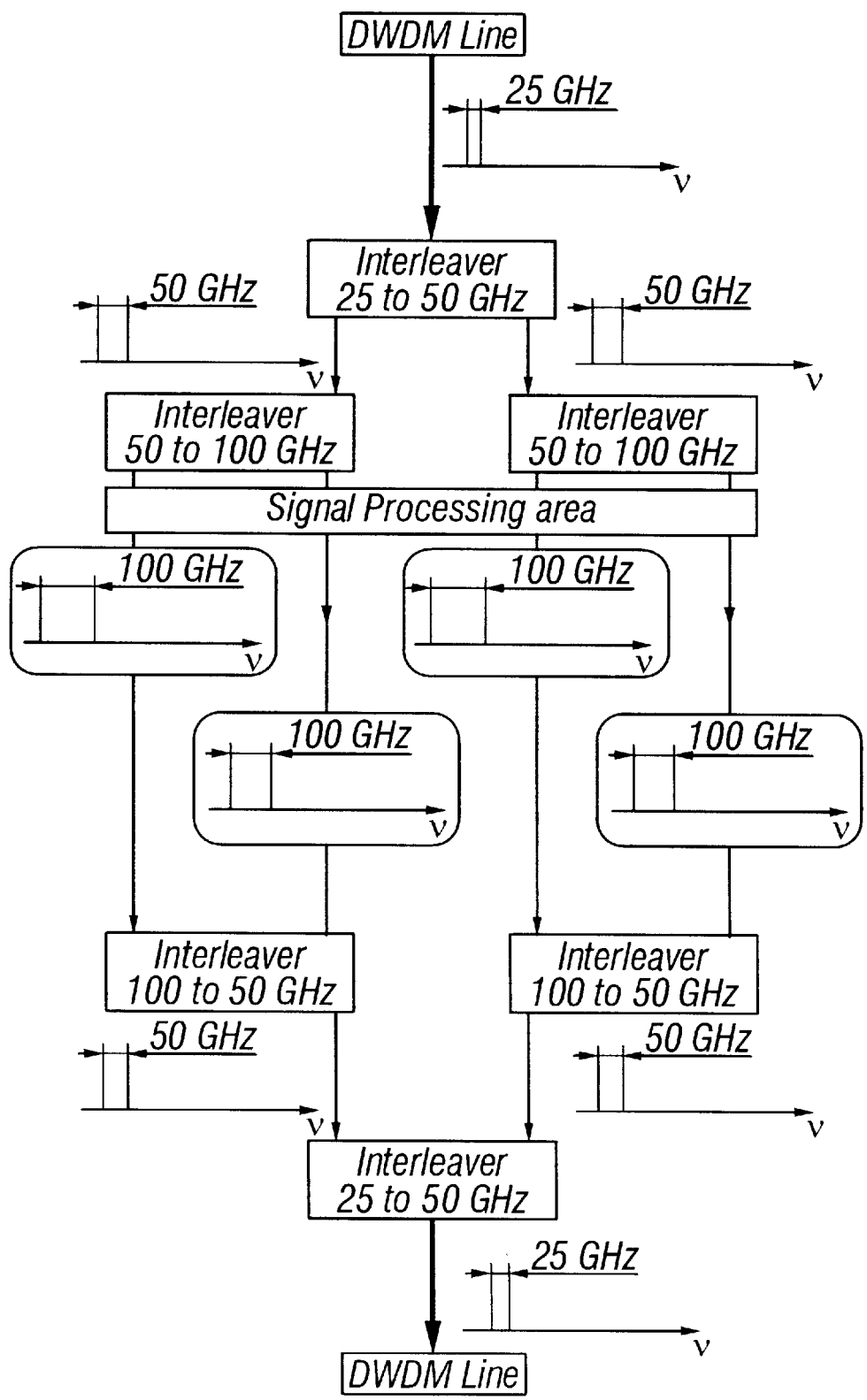

FIG. (3) is a perspective view of a number of optical devices in an arrangement to illustrate one embodiment of the invention.

FIGS. (4A) and (4B) are perspective views of the optical devices of FIG. (3) illustrating two PSP of the arrangement.

FIG. (5) is a top view of an interleaver system employing the arrangement of FIG. (3) to illustrate one embodiment of the invention.

FIG. (6) is a graphical diagram of the State of Polarization before and after the first quarter wave plate 104 in the arrangement of FIGS. (3), (4A), (4B) and (5).

FIG. (7) is a graphical diagram of the State of Polarization before and after the crystal association 101/102 in the arrangement of FIGS. (3), (4A), (4B) and (5).

FIG. (8) is a graphical plot of the numerical simulation of the frequency shift of a one crystal designed 50 to 100 GHz interleaver useful for illustrating the invention.

FIG. (9) is a graphical plot of the numerical simulation of the frequency shift of a two crystals and Faraday rotator designed 50 to 100 GHz interleaver according to an ideal response useful for illustrating the invention.

FIGS. (10a), (10b) are graphical plots of the numerical simulation of the spectral response of the invention with and without magnetic field adjustment relative to the ITU grid useful for illustrating the invention.

FIG. (11A) is a schematic view of a number of optical devices in an arrangement to illustrate an alternative embodiment of the invention.

FIG. (11B) is a schematic view of an optical device in the arrangement of FIG. (11A).

FIG. (12A) is a schematic view of a number of optical devices in an arrangement to illustrate another alternative embodiment of the invention.

FIG. (12B) is a schematic view of an optical device in the arrangement of FIG. (12A).

For simplicity in description, identical components are labeled by the same numerals in this application.

DETAILED DESCRIPTION OF THE EMBODIMENTS

In this invention, interleaver function is accomplished through the birefringent effect. It uses the State of Polarization (SP) variation at the output of birefringent materials according to the wavelength. This effect translates wavelengths into particular States of Polarization. An output polarizer can then be used to separate odd wavelengths from even wavelengths.

For any birefringent crystal, we can always define two particular SP called Principal State of Polarization (PSP). These PSP can cross the crystal without any modification of the polarization. One generally speaks about ordinary and extraordinary polarization. A medium is birefringent if the speed of light is not the same for the two PSP.

For any input electromagnetic field oscillating along any SP, it is always possible to describe this field by the sum of two orthogonal fields which propagate along the PSP. Then, a birefringent medium will induce a phase shift $\Delta\Phi$ between the two electromagnetic fields corresponding to the two PSP. Recombination of these two electromagnetic fields gives us the output field and then the output State of Polarization. It is obvious that this SP will depend on the phase shift $\Delta\Phi$, and then on the wavelength.

$$\Delta\Phi = \frac{2\pi}{\lambda} L\Delta n = \frac{2\pi}{c} v L\Delta n \qquad (1)$$

$\lambda$ corresponds to the wavelength of the light, $v$ represents the frequency of the light, $c$ is the light speed in vacuum, $L$ is the physical length of the crystal and $\Delta n$ the difference of the refractive index according to the two PSP. One generally speaks about the difference between an ordinary index and an extraordinary index. It becomes clear the phase difference $\Delta\Phi$, and then the SP, depend on the wavelength or the light frequency. One will also note that the two phase differences $\Delta\Phi$ and $\Delta\Phi+2k\pi$ (k is an integer) will give the same SP. Then, each SP will be repeated for certain values of the wavelength or light frequency. If one considers the light frequency, each SP will be repeated with a particular period $\Delta v$. And this period is defined by the crystal length $L$.

Ideally, the phase difference conforms according to the ITU grid. In other words, $\Delta\Phi$ is equal to $2k\pi$ (k is an integer) every $\Delta v=100$ GHz if a 50 to 100 GHz interleaver function is assumed. Then, the ideal phase difference $\Delta\Phi_o$ between ordinary and extraordinary ways (or the two PSP) can be written:

$$\Delta\Phi_0 = 2\pi \frac{v}{\Delta v} + 2m\pi = \frac{2\pi}{\lambda} \frac{c}{\Delta v} + 2m\pi \qquad (2)$$

$\Delta v$ corresponds to the output channel spacing (100 GHz). m can be any integer number. If one compares equations (1) and (2), the following equation is the result:

$$L\Delta n = \frac{c}{\Delta v} + m\lambda \qquad (3)$$

To make the real response match the ideal one conforming to the ITU grid, or any other predetermined wavelength grid, the function $L\Delta n$ needs to be constant according to the wavelength and environmental conditions. This last point is the purpose of the temperature stability and chromatic dispersion compensation issues.

The idea is based on the birefringence that modifies the polarization of the light according to the wavelength. According to this principle, a unique birefringent crystal should be enough to generate the effect. However, to stick to the ideal response despite variations in temperature and wavelength, the function $L\Delta n$ needs to be constant (equation 3). Unfortunately, there is no birefringent material with a negligible temperature variation and dispersion. Then, it becomes interesting to associate different materials with opposite thermal behavior and dispersion effect.

Further, to build a reliable interleaver, three conditions needs to be fulfilled: matching the ITU grid (or any other grid according to a communication protocol), stabilizing the temperature behavior and compensating for the chromatic dispersion. These three conditions lead to a three equations system. It becomes complicated to solve this system with only two materials. In fact, an efficient compensation by using only two birefringent crystals with opposite behavior under temperature variations and chromatic dispersion requires a very good accuracy on the crystal length (typically 1 $\mu$m).

Thus, two birefringent elements with opposite behavior under temperature variations and chromatic dispersion may be used so that the temperature variations and chromatic dispersion introduced by the two elements almost entirely cancel one another. The present invention introduces an additional compensation with a third material so that the wavelengths passed by the interleaver conform to the ITU grid. Furthermore, if the behavior of the element of third material under temperature variations and chromatic dispersion is adjustable, the otherwise stringent requirement for very accurate dimensions of the optical path lengths through the elements is relaxed.

In the preferred embodiment, to meet the need of a fine adjustment, Faraday rotators are proposed. In fact, a Faraday rotator presents good sensitivity to temperature and wavelength variations for a relative small birefringence. Also, it is easy to adjust the Faraday effect by playing with the magnetic field orientation (angle $\beta$ between the magnetic field and optical path) (see FIG. 2); that means playing with the orientation of the magnet, which may be an electromagnet or permanent magnet. Then, the polarization rotation of the Faraday rotator will help to adjust the response of the components of the interleaver to the ITU grid and the temperature and wavelength sensitivity of the Faraday rotator will help to complete the thermal and dispersion compensation.

Figure 3:
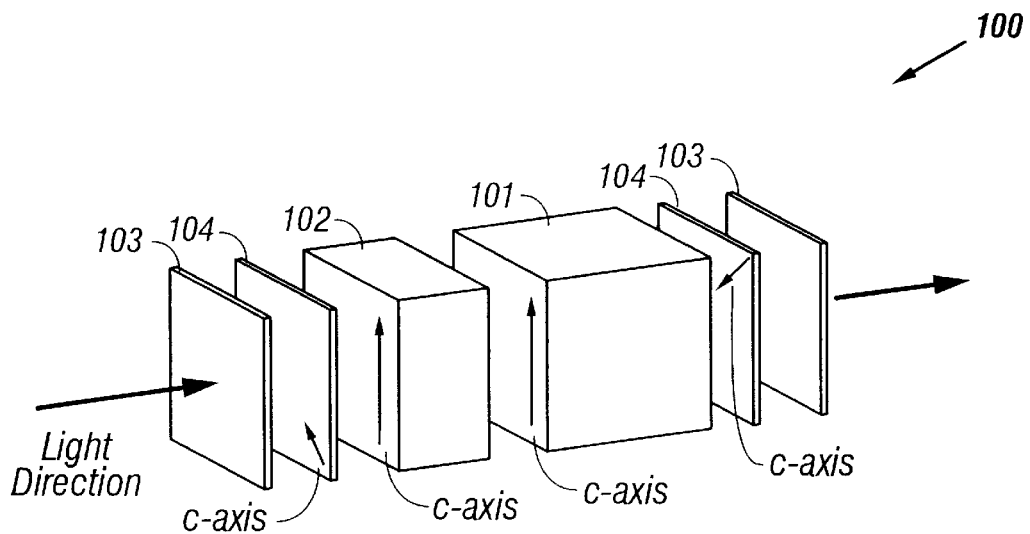

Finally, the interleaver function of the present invention is accomplished through the association of two birefringent crystals 101 and 102 and preferably two Faraday rotators 103 (FIG. 3). The materials of birefringent crystals 101 and 102 are chosen in a manner known to those in the art so that the temperature variations and chromatic dispersion introduced by the two elements almost entirely cancel one another. While two separate Faraday rotators are employed in the embodiment of FIG. 3, it will be understood that only one or more than two Faraday rotators may be used and are within the scope of the invention. If only one rotator is used, it may be placed at either one of the two locations of rotators 103 in FIG. 3.

C-axis of birefringent crystal 101 and 102 are aligned. It is possible to understand this two-crystal association like one unique crystal with optical characteristics corresponding to the average of the characteristics of each crystal. Association of the block 101/102 with the Faraday rotators is less straightforward. In fact, PSP of crystal association 101/102 are linear and PSP of Faraday rotators are circular. To make these different materials with different PSP work together, quarter wave plates 104 are preferably placed between Faraday rotators 103 and the birefringent crystal association 101/102 (FIG. 3). It should be noted that the c-axes of the quarter wave plates are both oriented at about 45 degrees from the c-axes of the birefringent crystals, and are substantially orthogonal to each other. This stacking of two birefringent crystals, one or two or more Faraday rotators and two quarter wave plates in arrangement 100 represents an important feature of the present invention.

Figure 4A:
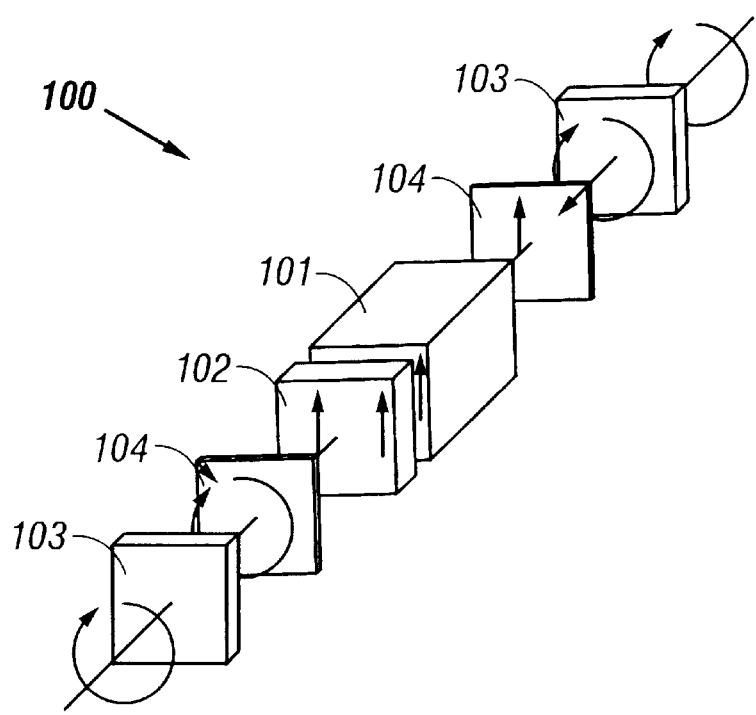
Figure 4B:
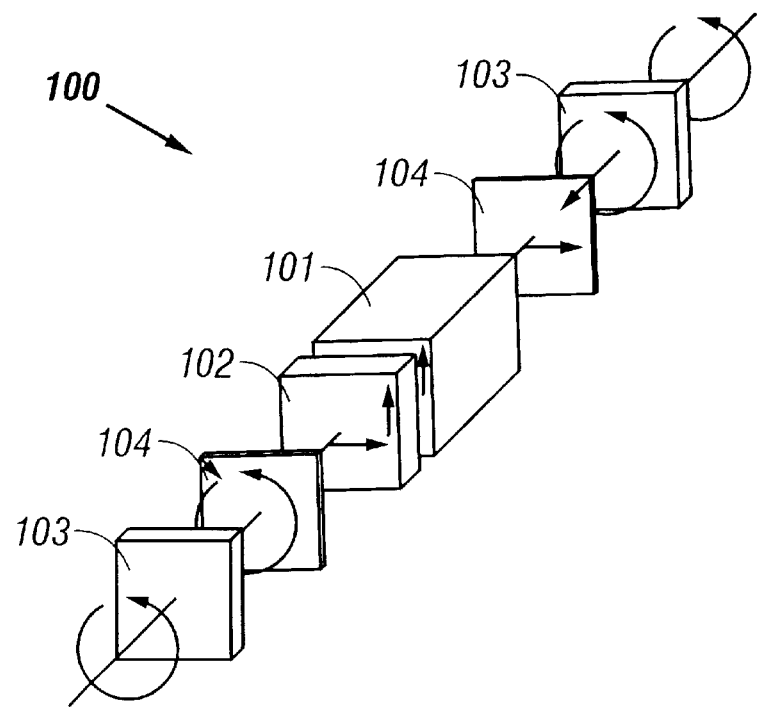
Figure 5:
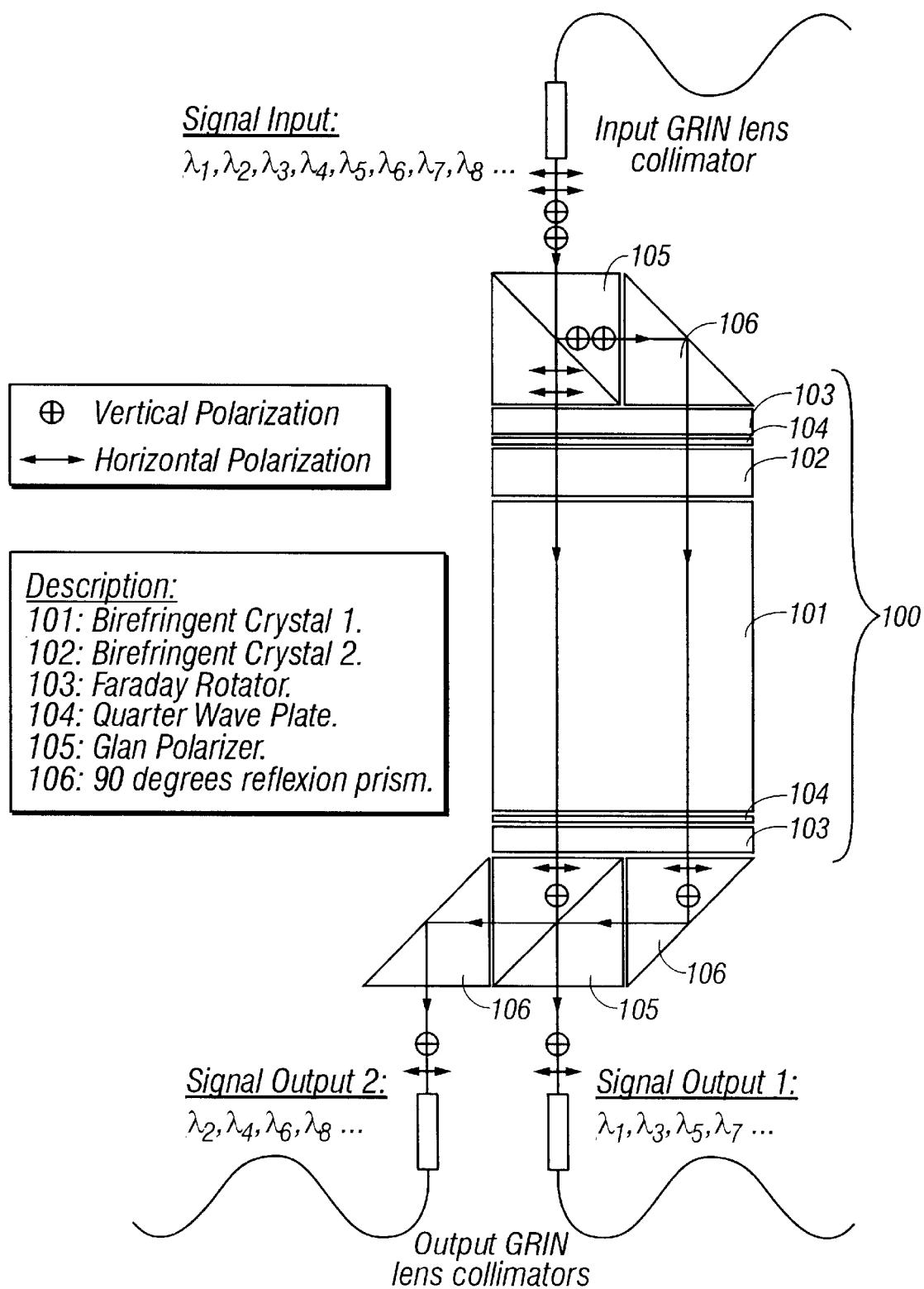

Whatever the birefringent material association, it is always possible to find two particular input SP that are not affected by wavelength or environmental modification. These particular SP are called Principal State of Polarization (PSP). One important property of these PSP is that they are orthogonal and they form a base for any SP. For a better understanding of the present Interleaver, FIGS. 4A and 4B show an example of the two PSP of the interleaver arrangement, with FIG. 4A showing one of the two PSP and FIG. 4B showing the other. The input and output PS are clockwise circular in FIG. 4A and polarization is linear along the optical axis into the crystal association 101/102. The input and output PS are counter-clockwise circular in FIG. 4B and polarization is linear and perpendicular to the optical axis into the crystal association 101/102. These two PSP are circular in both Faraday rotators 103, then linear in the crystal association 101/102 due to the action of the quarter wave plate.

FIG. (5) shows the main design. Two Glan polarizers 105 are added to both sides of the arrangement 100 of FIG. (4) arrangement. Purpose of the input polarizer is to separate the vertical and horizontal polarization. On account of a prism 106, these two linear polarization cross the arrangement at two different places. Input State of Polarization to the arrangement is always linear: horizontal in one path and vertical in the other. Output polarizer 105 recombines the beams according to the polarization, and then to the wavelength.

It is important to note that, because the polarization at the input to the arrangement is always linear, the projection of these polarization on the two PSP of the arrangement (FIG. 4) always gives an even energy repartition. In fact, linear input polarization can be described by two circular polarization carrying the same energy. Then, whatever the Interleaver input polarization, the repartition of the energy of this polarization over the two PSP of the Interleaver arrangement will always be the same. This point will help to reduce the PMD (polarization mode dispersion) effect.

FIG. (5) explains the design and the corresponding optical path. The light propagation into the component will now be followed and the interleaver function explained in detail.

At the input, all polarization states are possible. Then, horizontal and vertical polarization can carry odd and even wavelengths. The Glan polarizer 105 separates horizontal and vertical polarization by passing one and reflecting the other. The prism 106 reflects towards the arrangement 100 the polarization component reflected by polarizer 105, so that the light of the two polarization can cross the arrangement along two different optical paths according to the input polarization. If these two paths are physically separated, the optical properties of the arrangement with respect to both paths are exactly the same.

FIG. (5) shows the propagation of the light according to the two possible States of Polarization (horizontal or vertical). However, because the interleaver arrangement is exactly the same for both SP, one will first stay focussed first on the horizontal polarization. But it is easy to understand the explanation will be exactly the same for the other path (vertical polarization).

Figure 2:
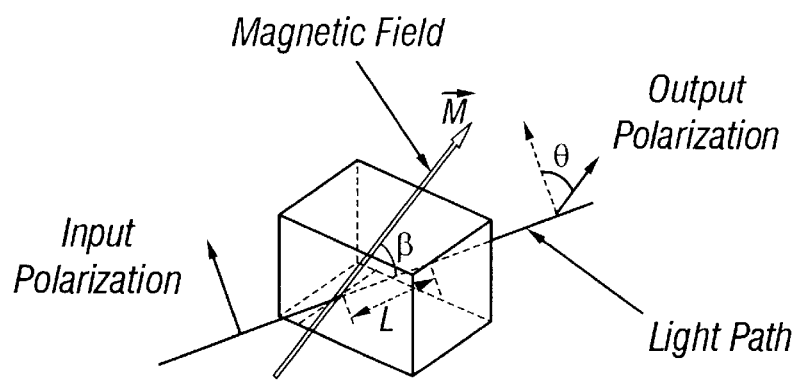
Figure 6:
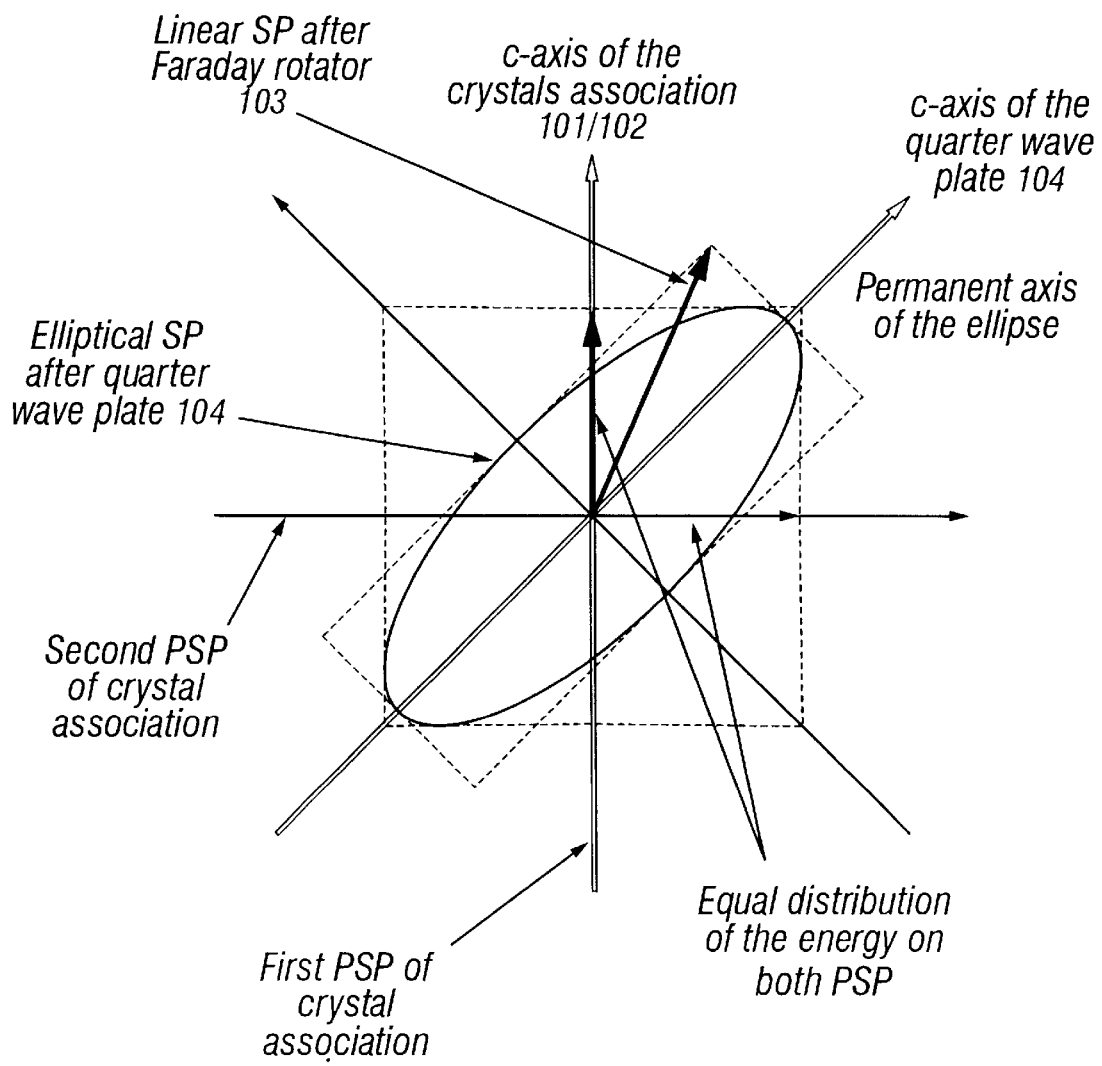

When the light enters the arrangement 100, Faraday rotator 103 first rotates the polarization. According to the temperature and wavelength, this rotation corresponds to a certain angle. This angle can be adjusted, by adjusting the magnetic field orientation (FIG. 2). This option will be useful to tune the response of the component to the ITU grid. After passing through this Faraday rotator, the light crosses the first quarter wave plate 104. The purpose of this plate is to send the same energy onto the two Principal States of Polarization of the crystal association 101/102 no matter what the State of Polarization is before reaching the quarter wave plate. In fact, the SP before the quarter wave plate 104 can be linear with any orientation. The SP after the quarter wave plate is generally elliptical, but orientation of the ellipse is always the same (FIG. 6). This is achieved by the 45 degrees between c-axis of the quarter wave plate 104 and the birefringent crystal association 101/102. For this reason, projection of this elliptical SP on the two PSP of the crystal association 101/102 gives exactly the same energy, or in other words, equal energy along the two PSP (FIG. 6).

Of course, phase difference between the two PSP can be anything. This phase difference $\Delta\Phi_1$ is actually a function of Faraday rotator effect, which depends of the magnetic field orientation $\beta$ with respect to the optical path(s) of the beam(s) through the Faraday rotator, temperature T and wavelength $\lambda$.

$$\Delta\Phi_1 = \Delta\Phi_1(\beta, \lambda, T) \cong \left[\Delta\Phi_1^0 + \frac{\partial \Delta\Phi_1}{\partial \lambda}(\lambda - \lambda_0) + \frac{\partial \Delta\Phi_1}{\partial T}(T - T_0)\right] \cdot \cos\beta \quad (4)$$

One now turns to the crystal association 101/102. The crystal axes of both crystals are aligned and vertical. Because of the quarter wave plate 104 in optical paths prior to the association 101/102, both PSP of this crystal association carry the same energy with an input phase difference of $\Delta\Phi_1$. Within the propagation into these two blocks, an additional phase difference $\Delta\Phi_2$ occurs or is introduced between the two PSP. According to the properties of the birefringent crystals in association 101/102, this additional phase difference is a function of wavelength and temperature:

$$\Delta\Phi_2 = \Delta\Phi_2(\lambda, T) \cong \Delta\Phi_2^0 + \frac{\partial \Delta\Phi_2}{\partial \lambda}(\lambda - \lambda_0) + \frac{\partial \Delta\Phi_2}{\partial T}(T - T_0) \quad (5)$$

Figure 7:
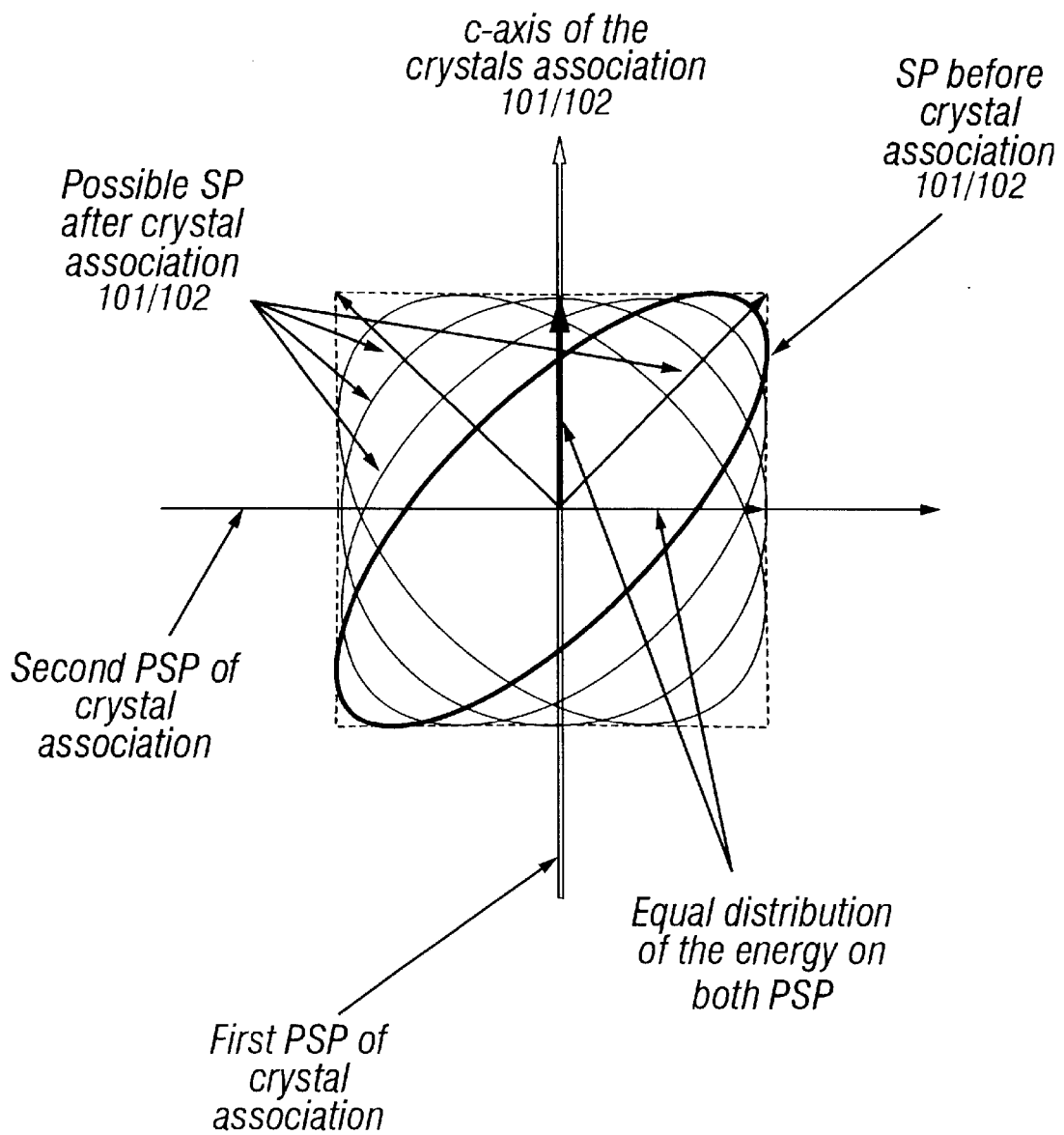
Figure 8:
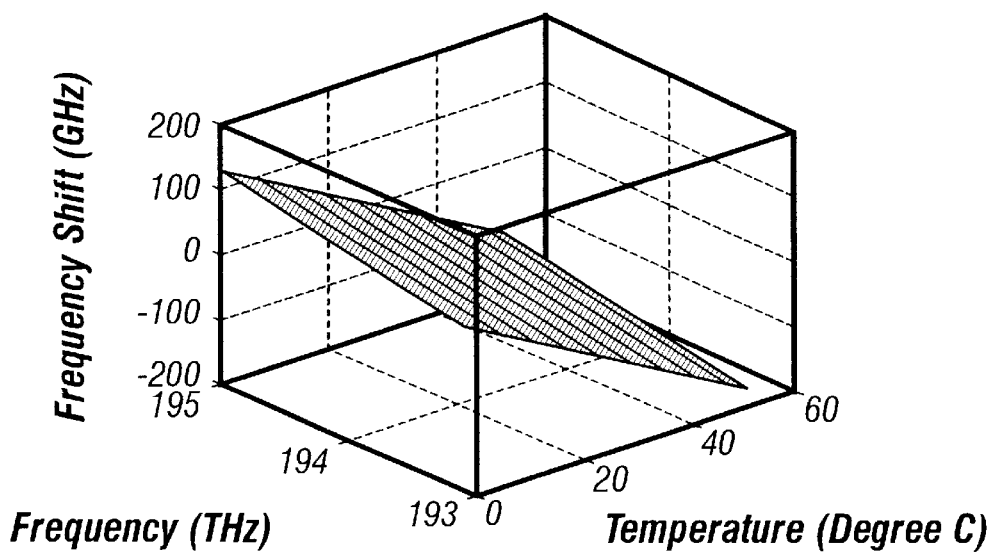
Figure 9:
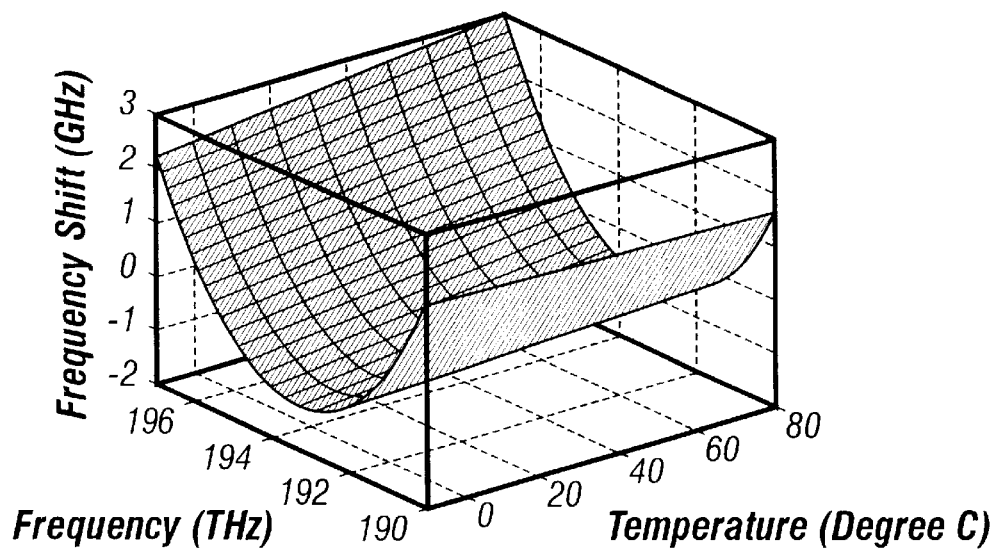

According to the total phase difference $\Delta\Phi_1 + \Delta\Phi_2$, the SP after the crystal association can be clockwise circular, linear, circular counter-clockwise. But it is generally elliptical. However, because there is always the same energy on both PSP, only some States of Polarization are available (FIG. 7).

The light now enters into the last part of the arrangement 100. This part is on the output side of the association 101/102 and actually performs the opposite of the first block of Faraday rotator and quarter wave plate in the optical paths on the input side of the association 101/102. Then, the effect of the second quarter wave plate is exactly the opposite than the first one. The second quarter wave plate on the output side will transform the elliptical polarization after the crystal association into linear polarization. Finally, the second Faraday rotator on the onput side of the association 101/102 completes the work of the first one. It is noted that the State of Polarization is linear before and after the arrangement 100 no matter what the wavelength, temperature or magnetic field orientation is at the input to the arrangement.

Because the c-axis of the second quarter wave plate is oriented at or nearly 90 degrees from the first quarter wave plate, the phase difference induced by the second quarter wave plate and Faraday rotator can be simply added to the effect of the first part of the arrangement containing the first quarter wave plate and first Faraday rotator. Further, preferably the two quarter wave plates have substantially the same dimension and characteristics and the two Faraday rotators have substantially the same dimension and characteristics. Thus one finally obtains the following phase difference for the entire arrangement 100

$$\Delta\Phi = 2\Delta\Phi_1(\beta,\lambda,T) + \Delta\Phi_2(\lambda,T) \quad (6)$$

Dimensions of the different parts of the arrangement are calculated to obtain $\Delta\Phi = 2k\pi$ in case of odd wavelength and $\Delta\Phi = (2k+1)\pi$ in case of even wavelength (k is an integer). The State of Polarization after the arrangement is the same as the SP before the arrangement for odd wavelength (horizontal polarization) and is perpendicular for even wavelength (vertical polarization). The second Glan polarizer 105 on the output side sends the horizontal polarization to the output 1 (odd wavelengths) and passes, with the assistance of two prisms 106 at the output side of the arrangement 100, the vertical polarization to the output 2 (even wavelength).

In case of the vertical polarization at the arrangement input, the effect is exactly symmetrical. Then, output State of Polarization will be linear vertical in case of odd wavelengths and linear horizontal in case of even wavelengths. The second Glan polarizer sends the horizontal polarization to the output 2 (even wavelengths) and the vertical polarization to the output 1 (odd wavelength).

It is important to notice that the two Faraday rotators can be placed on the same side of the arrangement. Phase difference will be identical and then lead to exactly the same effect.

Thermal Stability and Chromatic Dispersion Compensation

FIG. (8) gives the typical frequency shift of an interleaver designed with only one birefringent crystal. According to ideal response, a 100 GHz shift is observed over 20 nm range and 80 C. This shift is actually higher than the channel spacing itself. It becomes obvious temperature effect and chromatic dispersion need to be controlled. By using the association of three different birefringent materials, effect of temperature and chromatic dispersion can be greatly reduced. If one writes equation (6) in detail, the following equation is obtained:

$$\Delta\Phi = 2\Delta\Phi_1(\beta, \lambda, T) + \Delta\Phi_2(\lambda, T) \cong \quad (7)$$

$$2 \cdot \left[\Delta\Phi_1^0(\lambda) + \frac{\partial \Delta\Phi_1}{\partial \lambda}(\lambda - \lambda_0) + \frac{\partial \Delta\Phi_1}{\partial T}(T - T_0)\right] \cdot \cos\beta +$$

$$\Delta\Phi_2^0(\lambda) + \frac{\partial \Delta\Phi_2}{\partial \lambda}(\lambda - \lambda_0) + \frac{\partial \Delta\Phi_2}{\partial T}(T - T_0)$$

Because three materials are now at one's disposal, it is always possible to find a solution to the system:

$$\Delta\Phi(\beta, \lambda, T) =$$

$$\Delta\Phi_0(\lambda) \Leftrightarrow \begin{cases} 2\Delta\Phi_1^0(\lambda)\cos\beta + \Delta\Phi_2^0(\lambda) = \Delta\Phi_0 = 2\pi\frac{\nu}{\Delta\nu} + 2m\pi & (8a) \\ 2 \cdot \frac{\partial \Delta\Phi_1}{\partial \lambda} \cdot \cos\beta + \frac{\partial \Delta\Phi_2}{\partial \lambda} = 0 & (8b) \\ 2 \cdot \frac{\partial \Delta\Phi_1}{\partial T} \cdot \cos\beta + \frac{\partial \Delta\Phi_2}{\partial T} = 0 & (8c) \end{cases}$$

Equations (8a) to (8c) describe respectively the response alignment on the ITU grid, the chromatic dispersion compensation and the temperature stability. Coefficients $\partial \Delta\Phi_1/\partial \lambda$, $\partial \Delta\Phi_2/\partial \lambda$, $\partial \Delta\Phi_1/\partial T$ and $\partial \Delta\Phi_2/\partial T$ are functions of the birefringent material properties and physical length. With the suitable lengths for each part of the arrangement 100, first order variation according to wavelength and temperature can be completely compensated for. FIG. (9) gives a simulation of the frequency shift of the real response according to the perfect one. Only second order variations are visible. And the maximum shift is less than 1 GHz over 20 nm and 80 C and than 3 GHz over 50 nm and 80 C.

Fine Adjustment

Equations (8a) to (8b) can be solved by choosing the correct length for each of the three different materials into the arrangement. However, because of eventual inaccuracy on the crystal length or small variation of the optical properties, the system can remain unsolved for some arrangements. Particularly, m could become a non-integer in equation (8a). That can be translated to a general shift of the response in the frequency domain. In other words, real response does not fit the ITU grid.

Figure 10A:
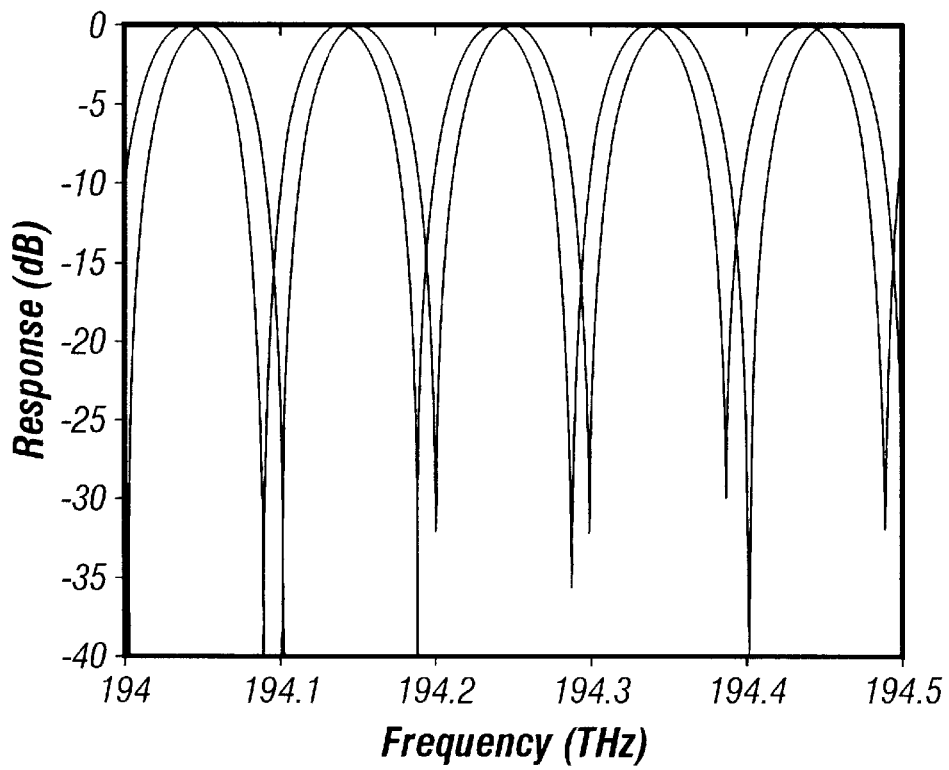
Figure 10B:
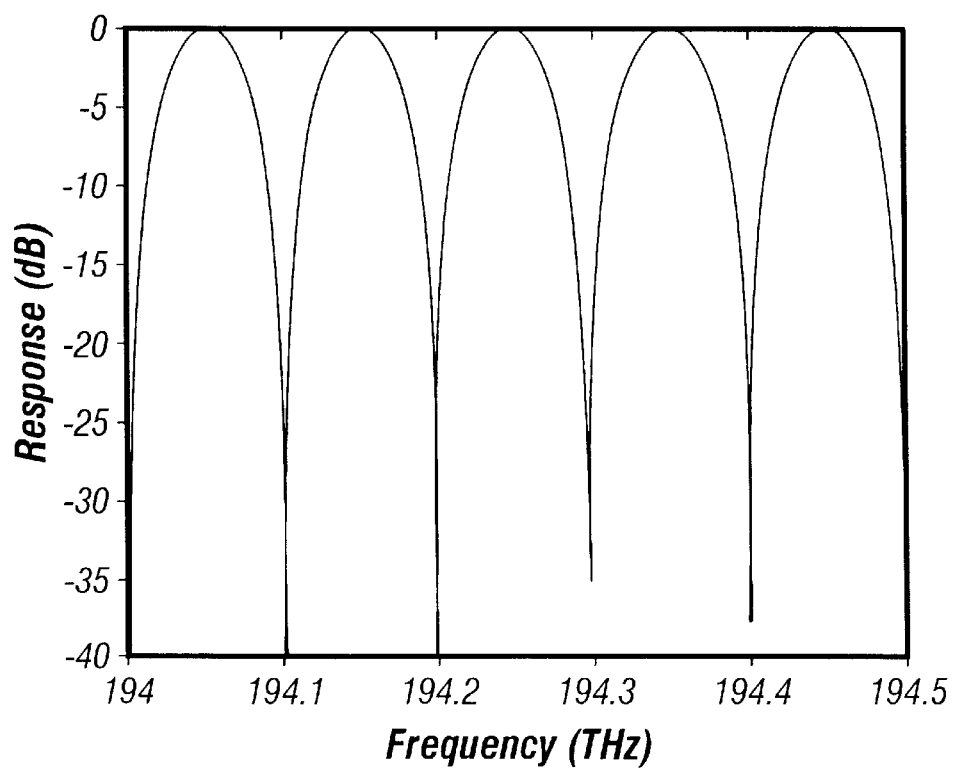
Figure 11A:
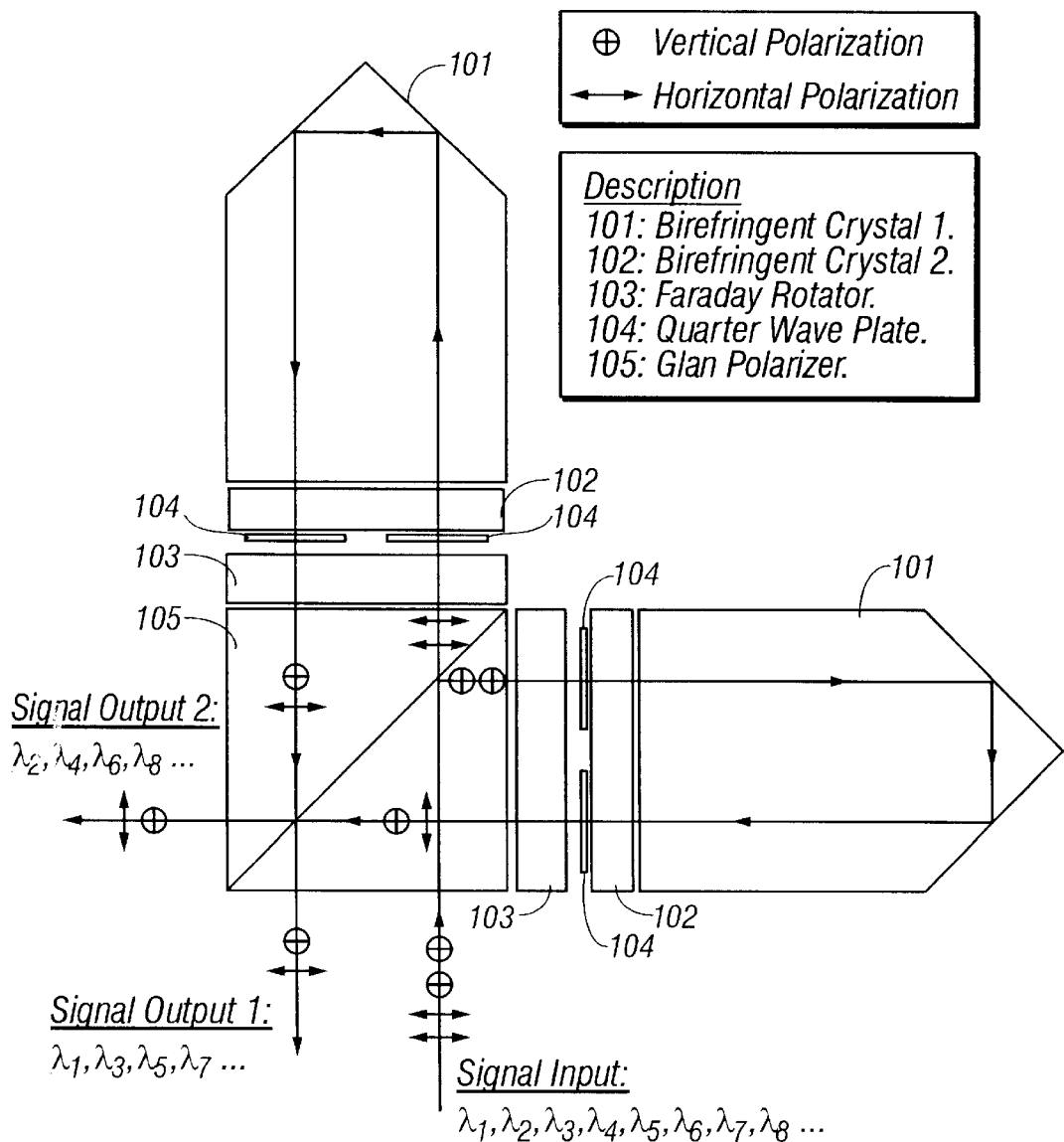
Figure 11B:
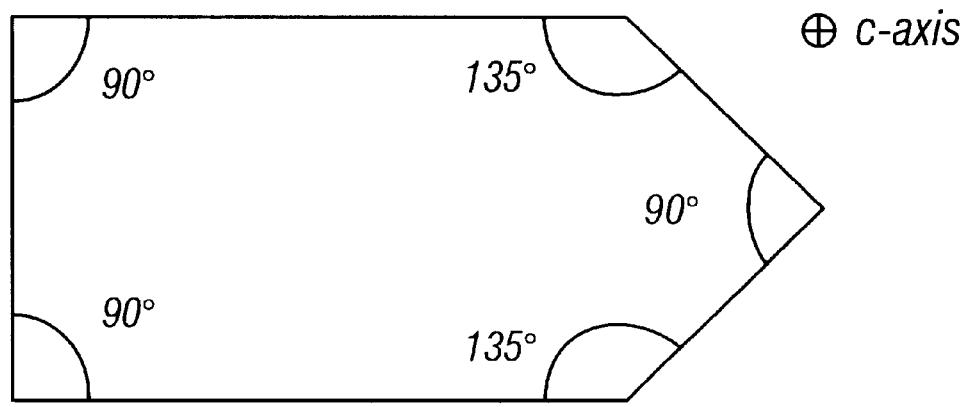
Figure 12B:
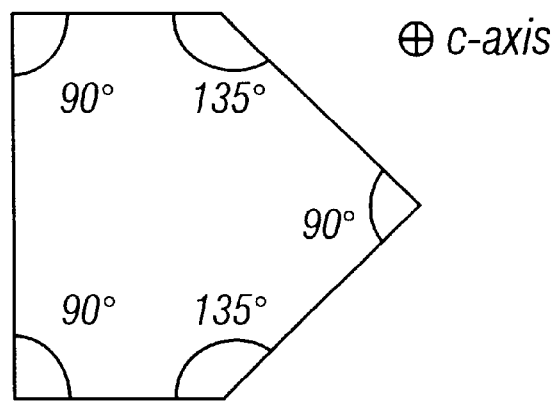
Figure 12A:
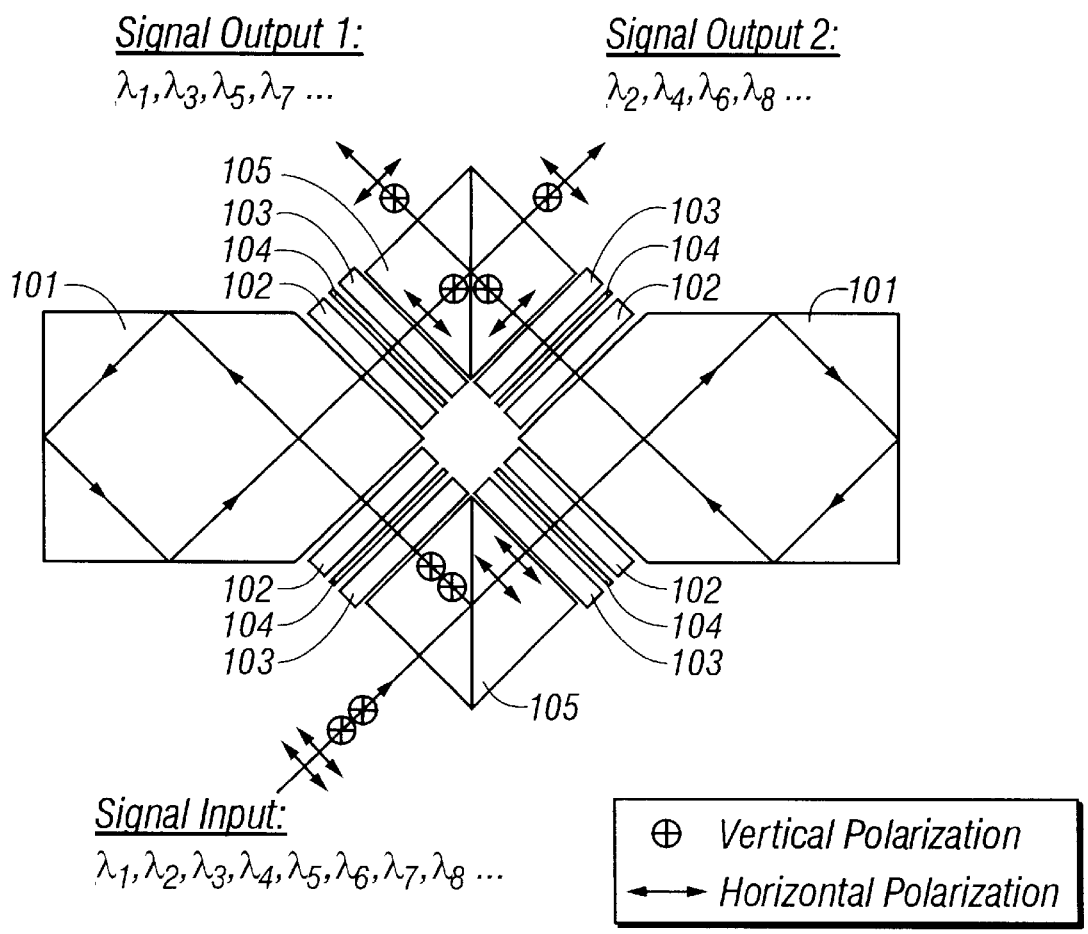

Magnetic field orientation β helps one to make the necessary correction to solve equation (8a). FIGS. (10a, 10b) give an example of this correction. FIG. 10a illustrates the response of arrangement 100 without magnetic field adjustment, and FIG. 10b illustrates the response of arrangement 100 with magnetic field adjustment. One can notice a variation on the angle β can also modify the result of equations (8b) and (8c). Correction on the temperature stability and chromatic dispersion compensation can also be achieved by adjusting the magnetic field orientation as long as m remains an integer.

Other Design Option

FIGS. (11A), (11B), (12A) and (12B) illustrate other options for the invention under the same principle. These design options are suitable to reduce the size of the birefringent crystals. It uses total internal reflection to minimize the requested length of the crystals. However, these designs may be more difficult to manufacture.

While the invention has been described by reference to various embodiments, it will be understood that modification changes may be made without departing from the scope of the invention which is to be defined only by the appended claims or their equivalents. All references referred to herein are incorporated by reference in their entireties.

What is claimed is:

1. An interleaver for interleaving wavelength components of an input beam of radiation having a first and a second group of different wavelength components, comprising:
   a first optical element separating the input optical beam into two beams having different polarization states, each of said at least two beams containing said two groups of wavelength components;
   three birefringent devices passing radiation from the two beams having said different polarization states or polarization states derived therefrom so that the first group of wavelength components of each of the two beams has a polarization state that is different from the polarization state of the second group of wavelength components; and
   one or more additional optical elements combining the first group of wavelength components of the two beams into a first output beam and the second group of wavelength components of the two beams into a second output beam by means of their different polarization states, wherein the three birefringent devices include three different optical materials so that the combination of the wavelength components into the first and second groups into separated output beams does not change over a predetermined range of temperatures and/or over a predetermined range of wavelengths, and conforms to a predetermined wavelength grid of a communication protocol.

2. The interleaver of claim 1, wherein optical path lengths through the devices are such that a phase difference of about 90 degrees is introduced between the first and second group of wavelength components.

3. The interleaver of claim 1, wherein said three birefringent devices comprise a Faraday rotator.

4. The interleaver of claim 3, wherein said three birefringent devices comprise two Faraday rotators that rotate said two beams substantially simultaneously.

5. The interleaver of claim 4, wherein said three birefringent devices further comprises an instrument applying a magnetic field to the Faraday rotator.

6. The interleaver of claim 5, wherein said instrument applies the magnetic field to the Faraday rotator so that the combination of the wavelength components into the first and second groups into separated output beams does not change over a predetermined range of temperatures and/or over a predetermined range of wavelengths.

7. The interleaver of claim 6, wherein said instrument causes an angle of the magnetic field applied to the Faraday rotator to change.

8. The interleaver of claim 3, further comprising two quarter wave plates: one in input paths of the beams to the three devices and one in output paths of the beams from the three devices.

9. The interleaver of claim 8, wherein one of said quarter wave plates is located in an optical path between said Faraday rotator and at least one of the three devices.

10. The interleaver of claim 8, wherein said quarter wave plates are oriented with their optical axes substantially orthogonal to each other.

11. The interleaver of claim 1, wherein said three birefringent devices include two birefringent crystals with opposite effects on the wavelength components in response to changes in temperature and wavelengths of the input beam.

12. The interleaver of claim 8, wherein said three birefringent devices include two Faraday rotators and two birefringent crystals, one of said two Faraday rotators located in input paths of the beams to the birefringent crystals and one in output paths of the beams from the birefringent crystals.

13. The interleaver of claim 1, wherein said wavelength grid is that of the ITU.

14. The interleaver of claim 1, wherein the two beams are internally reflected by interfaces of at least one of the three devices.

15. A method for interleaving wavelength components of an input beam of radiation having a first and as second group of different wavelength components, comprising:
   separating the input optical beam into two beams having different polarization states, each of said at least two beams containing said two groups of wavelength components;
   passing radiation from the two beams having said different polarization states or polarization states derived therefrom through three birefringent devices so that the first group of wavelength components of each of the two beams has a polarization state that is different from the polarization state of the second group of wavelength components; and
   combining the first group of wavelength components of the two beams into a first output beam and the second group of wavelength components of the two beams into a second output beam by means of their different polarization states, wherein the three birefringent devices include three different optical materials so that the combination of the wavelength components into the first and second groups into separated output beams does not change over a predetermined range of temperatures and/or over a predetermined range of wavelengths, and conforms to a predetermined wavelength grid of a communication protocol.

16. The method of claim 15, wherein said passing passes the beams along optical path through the devices of such lengths that a phase difference of about 90 degrees is introduced between the first and second group of wavelength components.

17. The method of claim 15, wherein said passing passes the beams through three birefringent devices that comprise a Faraday rotator.

18. The method of claim 17, wherein said three birefringent devices comprise two Faraday rotators, said method further comprising causing said Faraday rotators to rotate said two beams substantially simultaneously.

19. The method of claim 18, further comprising applying a magnetic field to the Faraday rotator so that the combination of the wavelength components into the first and second groups into separated output beams does not change over a predetermined range of temperatures and/or over a predetermined range of wavelengths.

20. The method of claim 19, further comprising the magnetic field to the Faraday rotator so that the combination of the wavelength components into the first and second groups into separated output beams does not change over a predetermined range of temperatures and/or over a predetermined range of wavelengths.

21. The method of claim 20, further comprising changing an orientation of the magnetic field.

22. The method of claim 17, further comprising passing the two beams through a quarter wave plate before passing them through some of the three devices and through another quarter wave plate after passing through some of the three devices.

23. The method of claim 22, further comprising orienting said quarter wave plates so that their optical axes are substantially orthogonal to each other.

24. The method of claim 15, wherein said wavelength grid is that of the ITU.

25. An interleaver for interleaving wavelength components of an input beam of radiation having a first and a second group of different wavelength components, comprising:

a first optical element separating the input optical beam into two beams having different polarization states, each of said at least two beams containing said two groups of wavelength components;

three birefringent devices passing radiation from the two beams having said different polarization states or polarization states derived therefrom so that the first group of wavelength components of each of the two beams has a polarization state that is different from the polarization state of the second group of wavelength components; and one or more additional optical elements combining the first group of wavelength components of the two beams into a first output beam and the second group of wavelength components of the two beams into a second output beam by means of their different polarization states;

wherein said three birefringent devices comprise two Faraday rotators that rotate said two beams substantially simultaneously; and wherein the three birefringent devices include three different optical materials so that the combination of the wavelength components into the first and second groups into separated output beams does not change over a predetermined range of temperatures and/or over a predetermined range of wavelengths, and conforms to a predetermined wavelength grid of a communication protocol.

26. An interleaver for interleaving wavelength components of an input beam of radiation having a first and a second group of different wavelength components, comprising:

a first optical element separating the input optical beam into two beams having different polarization states, each of said at least two beams containing said two groups of wavelength components;

three birefringent devices passing radiation from the two beams having said different polarization states or polarization states derived therefrom so that the first group of wavelength components of each of the two beams has a polarization state that is different from the polarization state of the second group of wavelength components; and one or more additional optical elements combining the first group of wavelength components of the two beams into a first output beam and the second group of wavelength components of the two beams into a second output beam by means of their different polarization states;

wherein said three birefringent devices comprise a Faraday rotator and an instrument applying a magnetic field to the Faraday rotator, wherein the combination of the wavelength components into the first and second groups into separated output beams does not change over a predetermined range of temperatures and/or over a predetermined range of wavelengths.

27. The interleaver of claim 24, wherein said instrument applies the magnetic field to the Faraday rotator so that the combination of the wavelength components into the first and second groups into separated output beams does not change over a predetermined range of temperatures and/or over a predetermined range of wavelengths.

28. The interleaver of claim 27, wherein said instrument causes an angle of the magnetic field applied to the Faraday rotator to change.

29. A method for interleaving wavelength components of an input beam of radiation having a first and as second group of different wavelength components, comprising:

separating the input optical beam into two beams having different polarization states, each of said at least two beams containing said two groups of wavelength components;

passing radiation from the two beams having said different polarization states or polarization states derived therefrom through three birefringent devices that comprises a Faraday rotator so that the first group of wavelength components of each of the two beams has a polarization state that is different from the polarization state of the second group of wavelength components;

combining the first group of wavelength components of the two beams into a first output beam and the second group of wavelength components of the two beams into a second output beam by means of their different polarization states; and applying a magnetic field to the Faraday rotator so that the combination of the wavelength components into the first and second groups into separated output beams does not change over a predetermined range of temperatures and/or over a predetermined range of wavelengths.

30. A method for interleaving wavelength components of an input beam of radiation having a first and as second group of different wavelength components, comprising:

separating the input optical beam into two beams having different polarization states, each of said at least two beams containing said two groups of wavelength components;

passing radiation from the two beams having said different polarization states or polarization states derived therefrom through three birefringent devices that comprises a Faraday rotator so that the first group of wavelength components of each of the two beams has a polarization state that is different from the polarization state of the second group of wavelength components; and combining the first group of wavelength components of the two beams into a first output beam and the second group of wavelength components of the two beams into a second output beam by means of their different polarization states so that the combination of the wavelength components into the first and second groups into separated output beams are approximately stable thermally and over a narrow wavelength range, and conforms to a predetermined wavelength grid of a communication protocol.

31. The method of claim 30, further comprising applying a magnetic field to the Faraday rotator so that the combination of the wavelength components into the first and second groups into separated output beams does not change over a predetermined range of temperatures and/or over a predetermined range of wavelengths.

* * * * *